(12) United States Patent
Dinh

(10) Patent No.: US 8,424,827 B2
(45) Date of Patent: Apr. 23, 2013

(54) CABLE AND BOX SUPPORT PLATE

(75) Inventor: Cong Thanh Dinh, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 225 days.

(21) Appl. No.: 12/644,083

(22) Filed: Dec. 22, 2009

(65) Prior Publication Data

US 2010/0155105 A1    Jun. 24, 2010

Related U.S. Application Data

(60) Provisional application No. 61/140,718, filed on Dec. 24, 2008.

(51) Int. Cl.
*B42F 13/00* (2006.01)

(52) U.S. Cl.
USPC .............................. 248/343; 248/906; 220/3.9

(58) Field of Classification Search ................... 248/343, 248/68.1, 142, 344, 909, 906, 903; 220/3.2, 220/3.3, 3.9, 3.92, 3.94; 174/58
See application file for complete search history.

(56) References Cited

U.S. PATENT DOCUMENTS

| | | | |
|---|---|---|---|
| 1,113,092 A * | 10/1914 | Denier et al. ................... | 220/3.5 |
| 2,896,887 A | 7/1959 | Beltz | |
| 3,363,864 A | 1/1968 | Olgreen | |
| 3,861,015 A | 1/1975 | Hooven | |
| 4,560,126 A | 12/1985 | Judkins et al. | |
| 4,705,244 A | 11/1987 | Saotome et al. | |
| 5,067,677 A | 11/1991 | Miceli | |
| 5,277,006 A | 1/1994 | Ruster | |
| 5,354,952 A | 10/1994 | Hickey | |
| 5,698,820 A | 12/1997 | Collard | |
| 5,743,497 A | 4/1998 | Michael | |
| 5,883,332 A | 3/1999 | Collard | |
| 6,285,565 B1 | 9/2001 | Aberg et al. | |
| D449,218 S | 10/2001 | Vrame | |
| 6,313,406 B1 | 11/2001 | Gretz | |
| 6,382,569 B1 | 5/2002 | Schattner et al. | |
| 6,590,155 B2 * | 7/2003 | Vrame et al. ................... | 174/50 |
| 6,996,943 B2 * | 2/2006 | Denier et al. ................ | 52/220.7 |
| 7,051,983 B2 | 5/2006 | Sirignano | |
| 7,077,688 B2 | 7/2006 | Peng | |
| D531,010 S | 10/2006 | Vrame | |
| 7,394,020 B2 * | 7/2008 | Gerardo .......................... | 174/58 |
| 7,521,631 B2 * | 4/2009 | Dinh ............................... | 174/58 |
| 7,699,283 B2 * | 4/2010 | Vrame et al. ................... | 248/317 |
| 2003/0182881 A1 * | 10/2003 | Denier et al. ................ | 52/220.7 |
| 2004/0113028 A1 | 6/2004 | Grendahl | |
| 2005/0067546 A1 * | 3/2005 | Dinh ............................. | 248/343 |
| 2005/0189453 A1 | 9/2005 | DeGuevara | |

* cited by examiner

*Primary Examiner* — Kimberly Wood
(74) *Attorney, Agent, or Firm* — Hoffmann & Baron, LLP

(57) ABSTRACT

The present invention provides a cable and box support plate which is a rectangular, flat plate with integral cable/conduit support member formed therewith. The cable/conduit support members are made from the same material as the remaining plate and formed by punching or stamping out the support members therein.

17 Claims, 8 Drawing Sheets

CABLE AND BOX SUPPORT PLATE

CROSS REFERENCE TO RELATED APPLICATIONS

This application claims priority to U.S. Provisional Patent Application No. 61/140,718 filed on Dec. 24, 2008, the contents of which is incorporated herein by reference in its entirety.

FIELD OF THE INVENTION

The present invention relates generally to a support plate for an electrical box and cable. More particularly, the present invention relates to a mountable support plate including cable support incorporated therein to support cables extending in various directions.

BACKGROUND OF THE INVENTION

Wires and cables extend throughout buildings, houses and other structures to provide power or data to end use devices. Managing a cable system requires various supports to be used to attach and secure cables across a span.

Various devices have been used to support cables. For example, cable tray assemblies are well known for use as a support system for carrying electrical cables, wires, tubing, piping or other conduits over various distances in buildings and other commercial structures. The cable trays do not provide a support for cables from different directions. Traditional cable trays are bulky and cumbersome devices. Cable support is limited to the direction of the run of the trays.

Additionally, various conduit clamping devices are used to attach individual conduit to support structures and electrical boxes. The conduit clamping devices are separate devices that attached to a support plate and also attach to a conduit. The conduit clamping devices include C-clamps, strut straps or minnies which are secured to plates, support structures and conduits by use of nuts and bolts. These devices include many parts that are difficult to install. These devices require assembly of multiple components on-site. Since theses clamping devices are individual pieces that require fasteners to provide attachment to the conduit and the support structure, the fasteners and devices are easily dropped or lost during installation.

It is, therefore, desirable to provide a one piece support unit that is able to support cables from various directions without the need to additional fasteners and without the requirement of being assembled together on site.

SUMMARY OF THE INVENTION

The present invention provides a cable and box support plate which is a rectangular, flat plate with integral cable/conduit support members formed therewith. The cable/conduit support members are made from the same material as the remaining plate and formed by punching or stamping out the support members therein.

The present invention provides for a cable and box support plate for supporting cables including a rectangular, flat planar plate with integral cable/conduit support member formed therein. The plate includes a central portion with holes for attachment to an electrical box. The support members are located on either side of the central portion. The plate includes an edge perpendicularly extending from the plate at either end of the plate. The support plate has a perimeter about the support plate and the support members are positioned internally to the perimeter of the support plate.

DETAILED DESCRIPTION OF THE PREFERRED EMBODIMENTS

Figure 1:
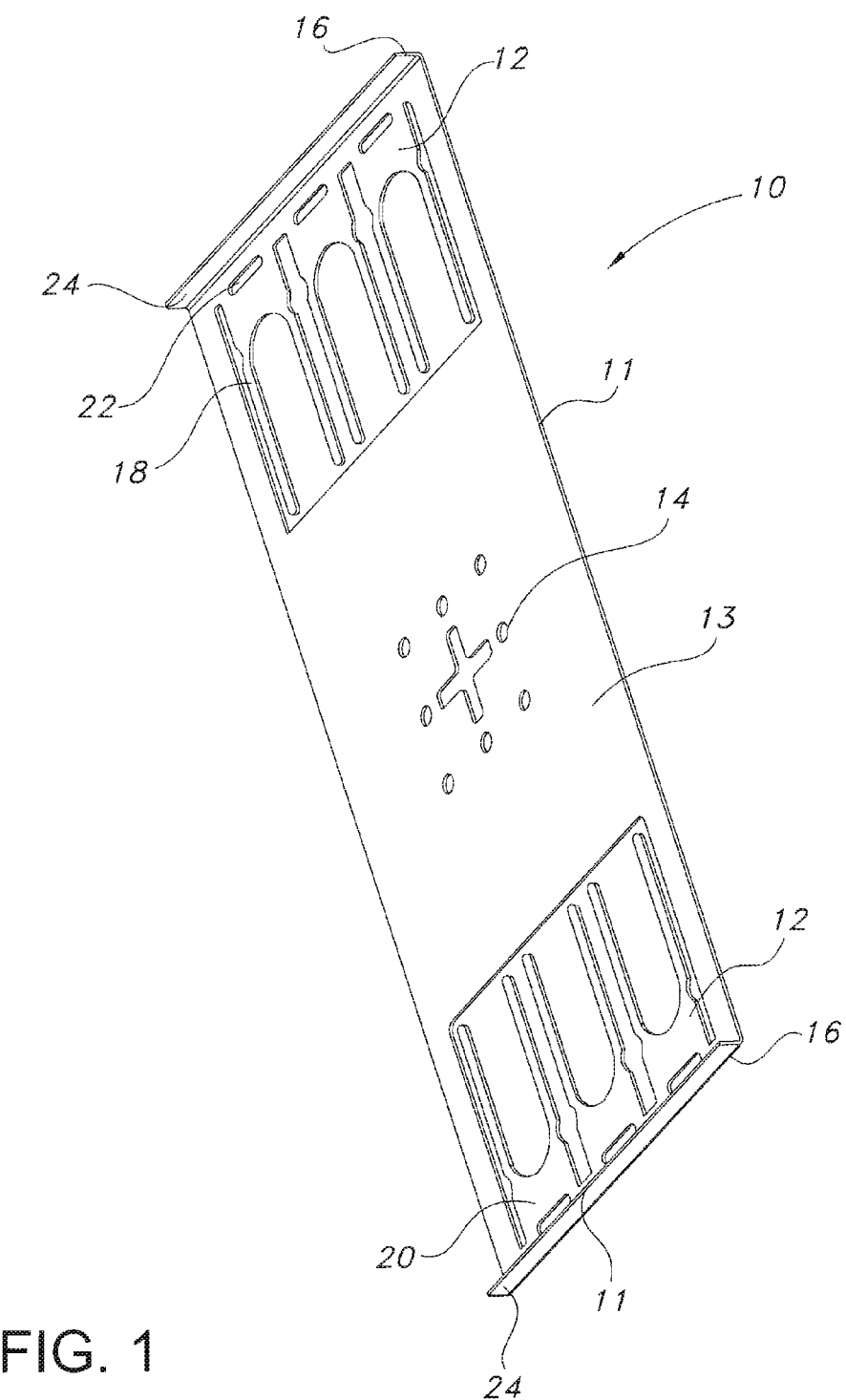
FIG. 1 is a perspective view showing a cable box support plate of the present invention.

The present invention provides a support plate 10 with a cable support structure formed from the support plate 10. FIG. 1 shows a cable and box support plate 10 which is a rectangular, flat planar plate with integral cable/conduit support member 12 formed therein. The plate 10 has a rectangular perimeter 11 and the support member(s) 12 are located within the perimeter 11 of the plate 10. The cable/conduit support members 12 are made from the same material as the remaining plate and formed by punching or stamping out the support members 12 therein. The support member 12 is attached to the plate 10 by material continuity because the support members 12 and plate 10 are integrally formed for the same plate of material. The center 13 of the plate includes various mounting holes 14 for easy attachment of an electrical box or other support structure to the plate. Further, the support members 12 are formed at either ends 16 of the plate. The support members 12 are punched out of the support plate 10. The support members 12 are shown as a series of U-shaped prongs 18 having a thick base 20 closest to the ends of the plate. The base 20 includes a slot 22 therein to permit bending of the support members 12. Additionally, the ends 16 include a ridge 24 extending perpendicularly from the remaining support plate 10. The ridge 24 restricts the movement of the support members 12 when the support members 12 are bent upwardly, perpendicularly to the support plate 10.

Figure 2:
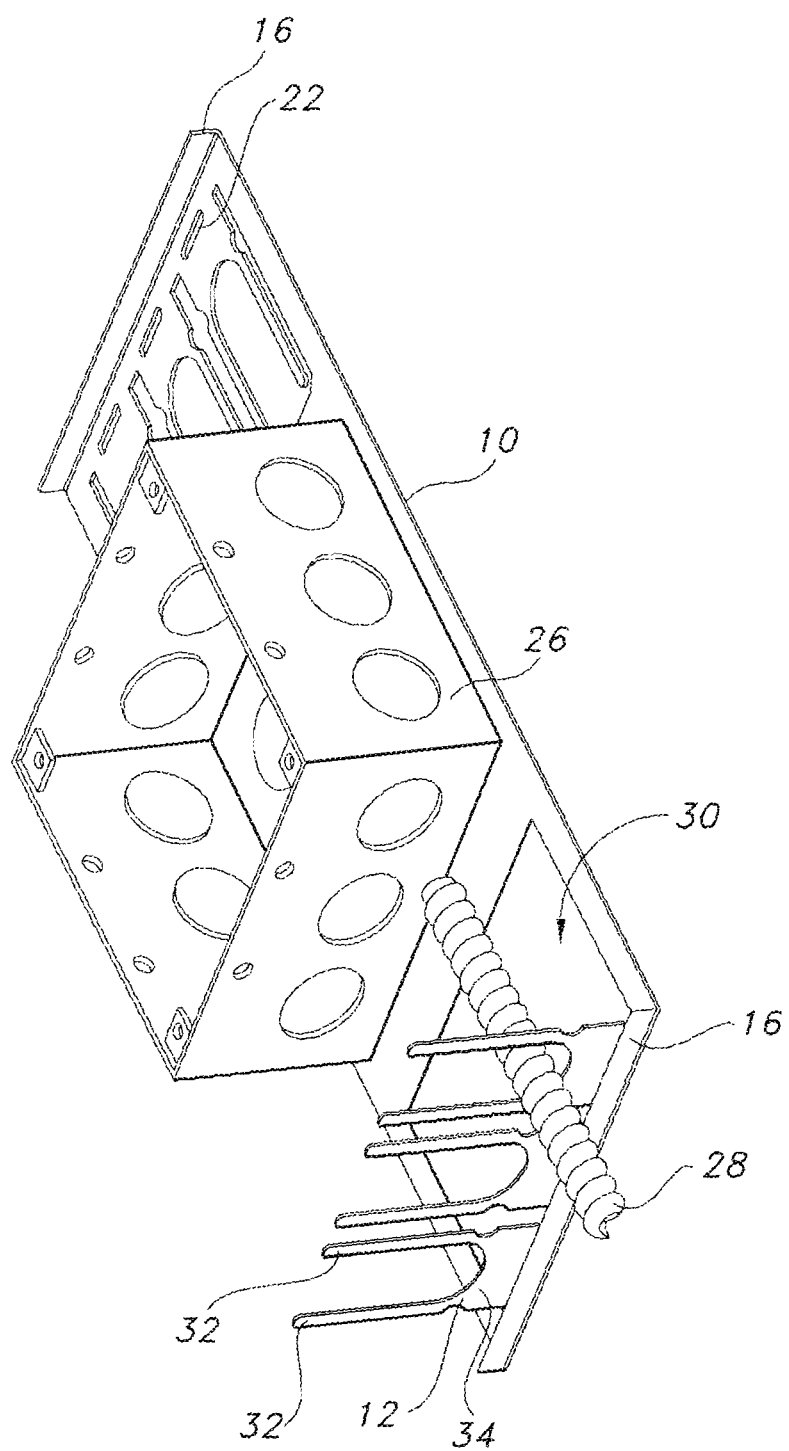
FIG. 2 is a perspective view showing the cable support plate of FIG. 1 attached to a cable box and a cable supported therein.

FIG. 2 shows a box 26 attached at the center 13 of the plate 10 and one end 16 of the support has the support members 12 bent upwardly, perpendicularly to the plate 10 to provide for support for a cable 28 extending from the box 26. The support members 12 are bent at the bending line defined by the slot 22. FIG. 2 shows that the support members 12 are punched out from the support 10 and the remaining waste material is removed. When the support members 12 are bent into place an open rectangular space 30 exists where the support members 12 once seated. The remaining waste material is removed to provide for easy grip of each prong 18 during installation of a cable 28. Each prong 18 has two thin side sections 32 and the cable 28 extends through the U-shaped prong 18 and rests on the lower portion 34 of the prong 18. The two side sections 32 retain the cable 28 within the prong 18 and limit horizontal movement of the cable 28. Side sections 32 can be bent or twisted together if desired to fully surround cable 28.

Figure 3:
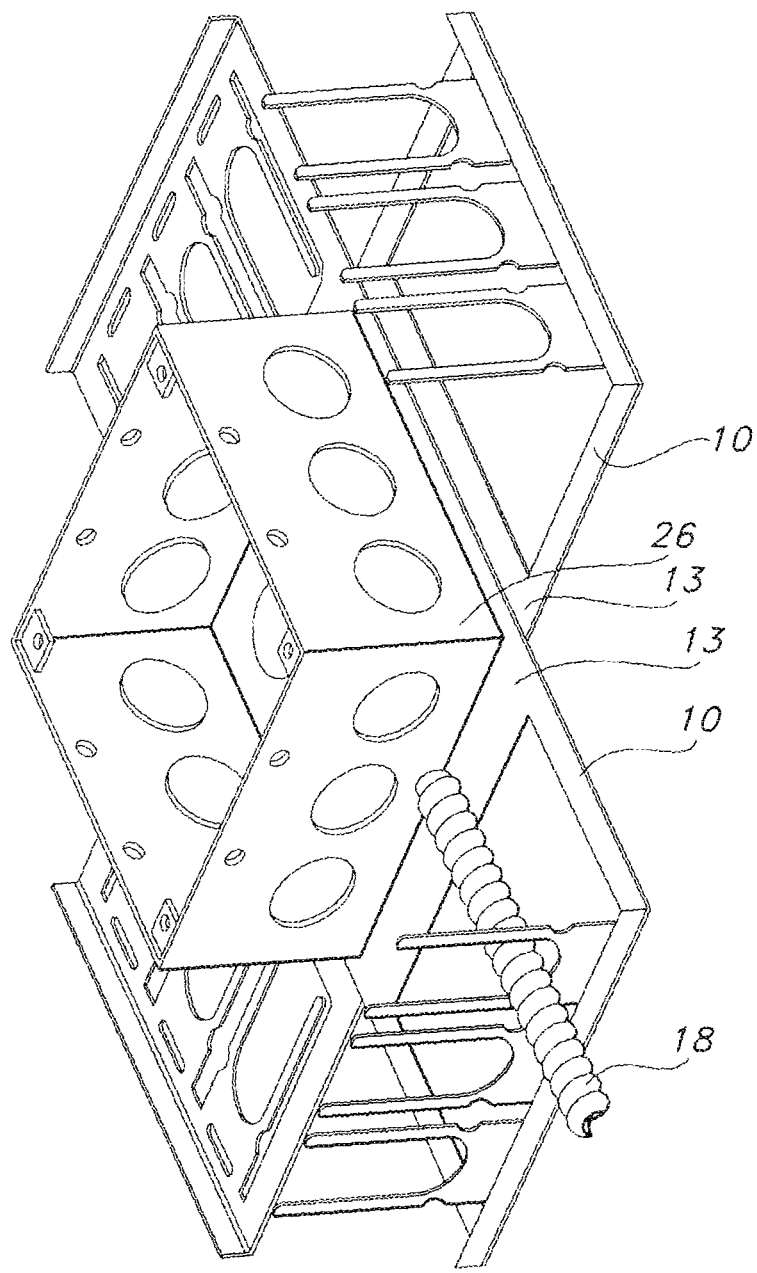
FIG. 3 is a perspective view showing two cable support plates of FIG. 1 attached to a cable box and a cable supported therein.
Figure 4:
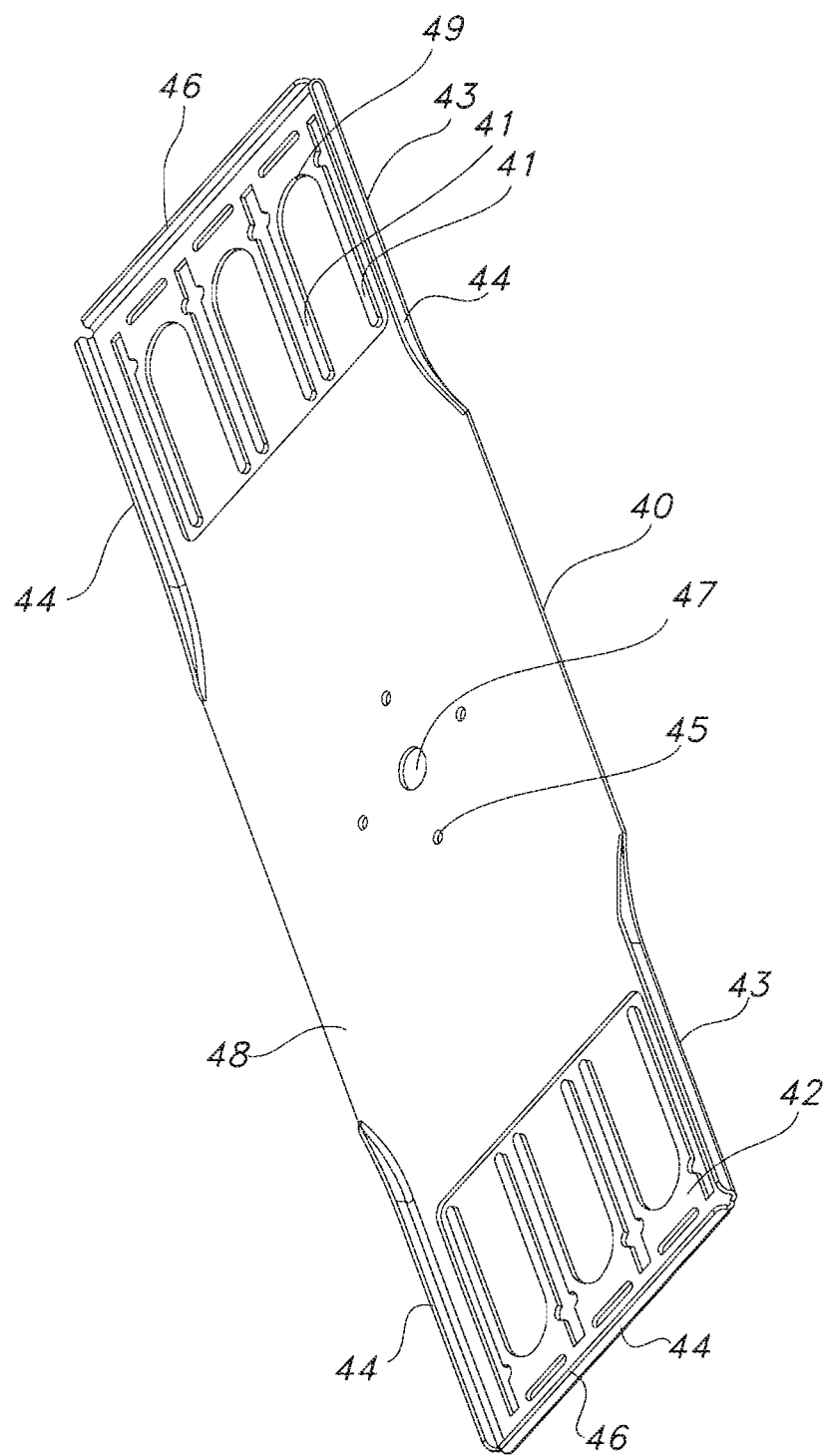
FIG. 4 is a perspective view showing a cable box support plate of the present invention.
Figure 5:
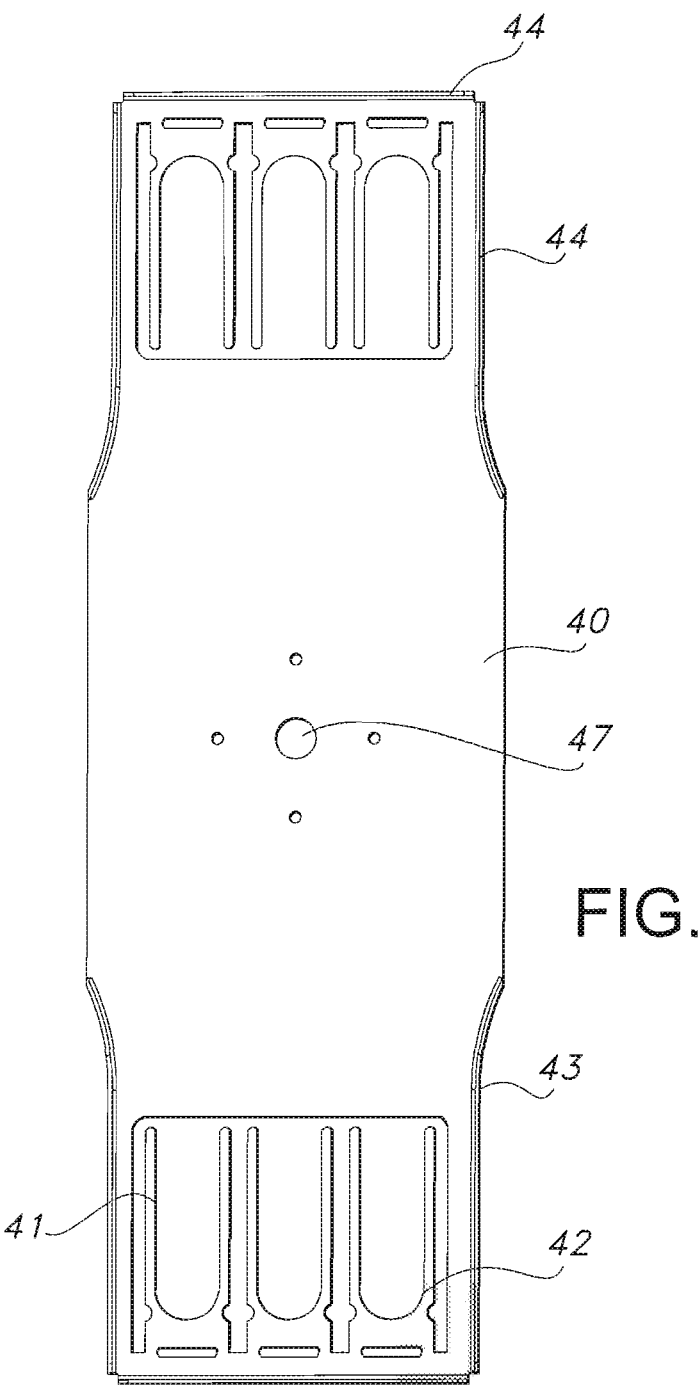
FIG. 5 is a front plan view showing the cable box support plate of FIG. 4.
Figure 6:
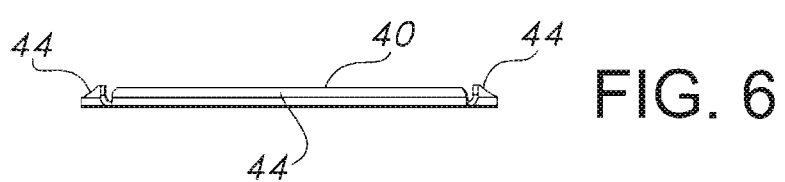
FIG. 6 is a top elevational view showing the cable box support plate of FIG. 4.
Figures 7, 8:
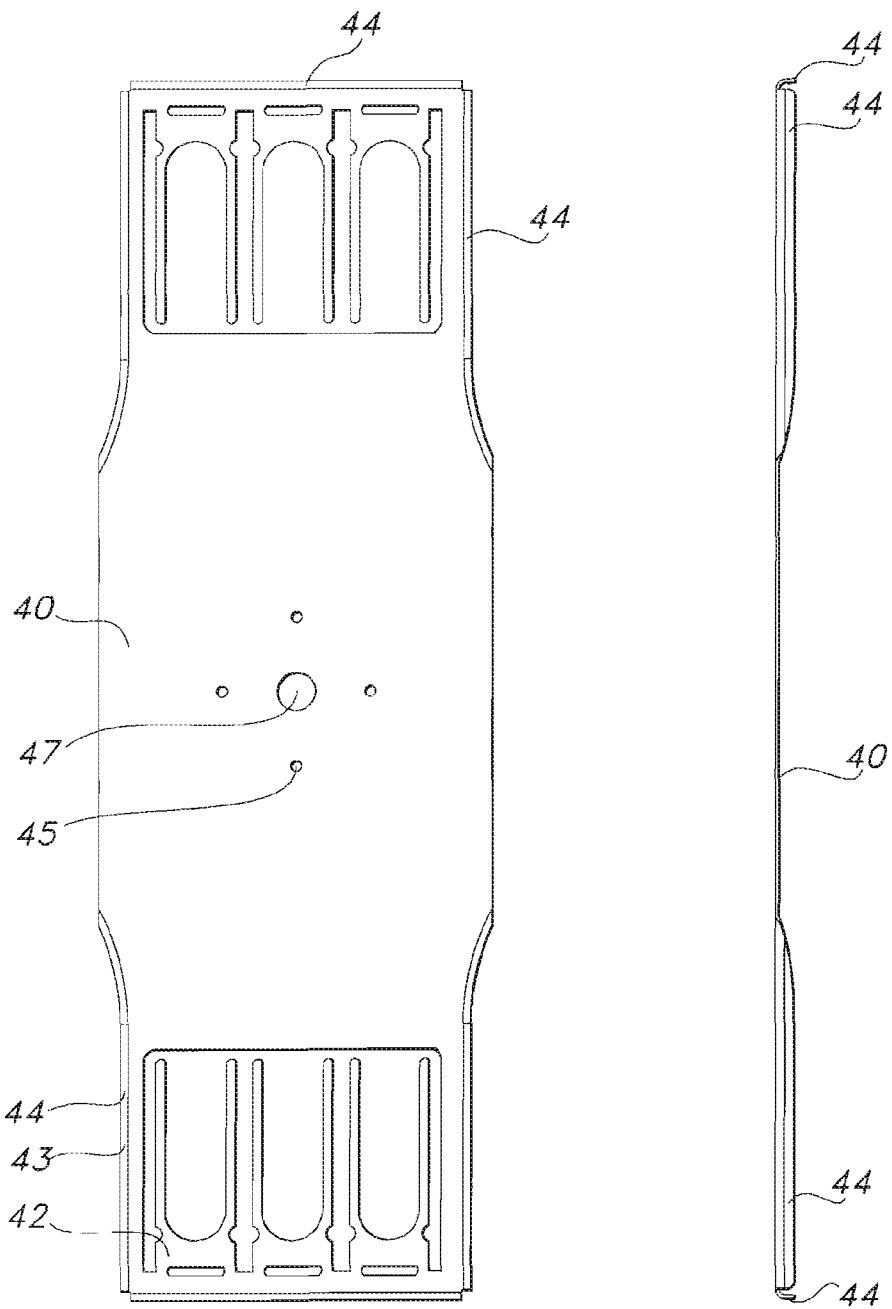
FIG. 7 is a back plan view showing the cable box support plate of FIG. 4.
FIG. 8 is a side elevational view showing the cable box support plate of FIG. 4.

FIG. 3 shows two support plates 10 attached at the center portion 13 and extending perpendicular to each other. The box 26 may be affixed to the brackets by mounting hardware such as by screws which are screwed through the box 26 and into the holes 14 in the plates 10. The plate 10 is also attached to a threaded rod through the center mounting hole 14 to provide support to the cables entering the box 26. The box 26 includes holes to attach to the rod. The rod is attached to a support structure of suspended from a ceiling by the other end of the support plate 10 attachment. This provides for supports of cables 28 running through the box 26 out each of the sides of the box 26. Additionally, the present invention provides for the user to custom design the cable and box support as needed. A variety of prong 18 combinations may be used depending on the cable support required. Each prong 18 can be individually moved vertically in place. For example, one prong 18 may be positioned vertically to accommodate a cable 28 or various combinations of prongs 18 may be positioned to accept a cable 28 as needed to for a specific cable system. Prongs 18 are preferably punched out in plate 10 so that they are in alignment with the knock-outs in box 26.

Figure 9:
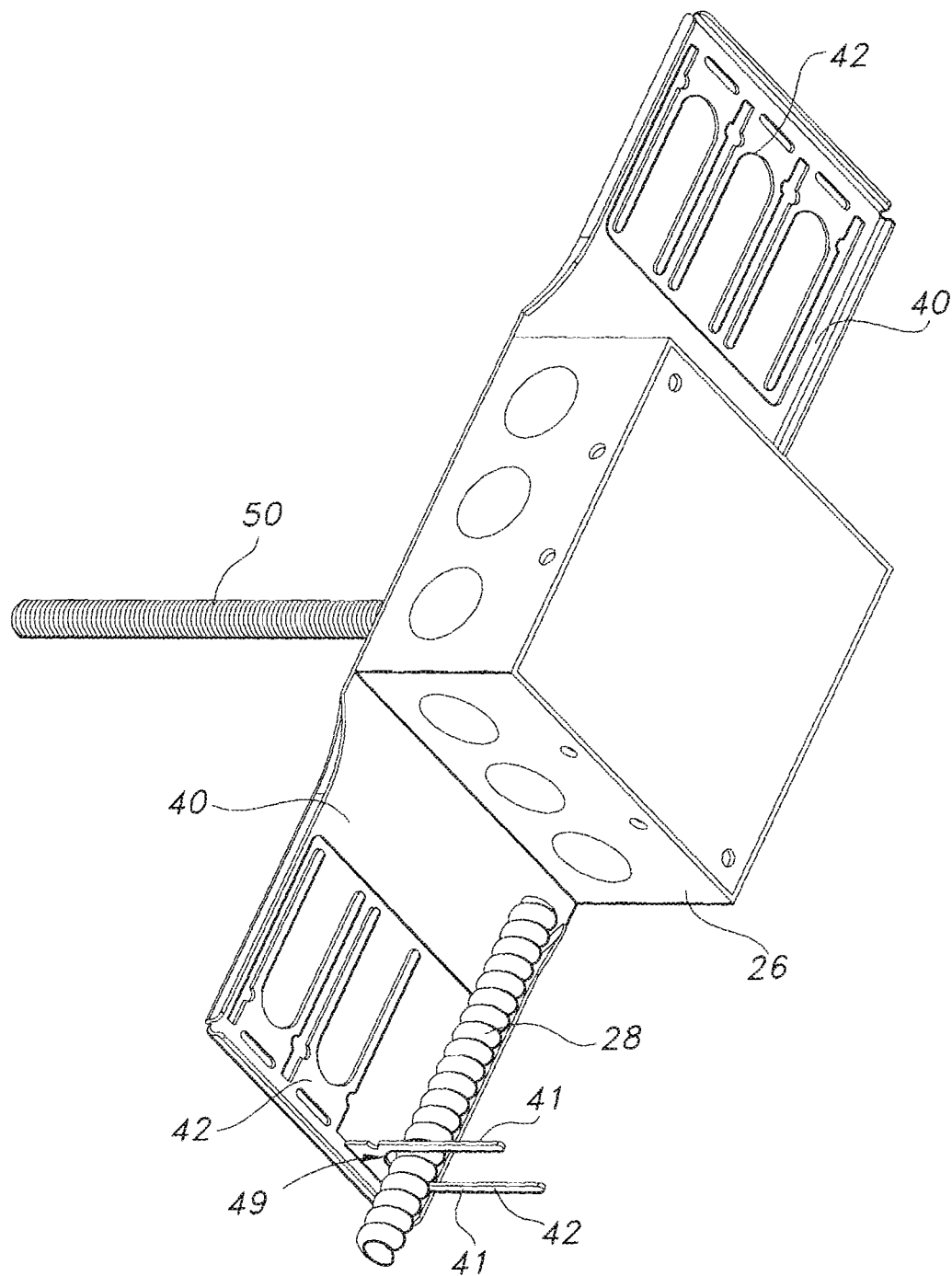
FIG. 9 is a perspective view showing the cable support plate of FIG. 4 attached to a cable box and a cable supported therein.

FIGS. 4-10 show a further embodiment of a cable and box support plate 40 which is similar to the plate 10 including a rectangular, flat plate with integral cable/conduit support member 42 formed therein. The support members 42 are individually moveable from within the plane of the plate 40 to a perpendicular position. The support members 42 are integrally formed from the support plate 40 and thus attached by material continuity. Support member 40 further includes edge stiffeners 44 extending perpendicularly from the support plate 40 on the exterior edge, or perimeter 43 of the support plate 40. The edge stiffeners 44 extend a portion of the distance along the edge of the support plate 40 and on either ends 46. The edge stiffeners 44 surround the support members 42. The center portion 48 of the support plate 40 remains without an edge stiffener 44 to prevent the edge stiffener 44 from interfering with the flush attachment of a cable box to the support 40. The center 48 of the plate 40 includes various mounting holes 45 for easy attachment of an electrical box or other support structure to the plate 40, and a center mounting hole 47 for engagement with a threaded rod 50 to attach the support plate 40 and box 26 to a ceiling or other support structure, as shown in FIG. 9.

FIG. 9 shows a box 26 attached at the center 48 of the plate 40. A threaded rod 50 is suspended from a ceiling or support structure with the plate 40 and box 26 being secured thereto. The threaded rod 50 engages with center hole 47 of support plate 40 to attach the plate to the ceiling and the plate 40 provides support to the cables 28 extending into the box 26. The rod 50 also engages with the box 26 through a hole in the box 26 which is not shown in the figure due to a blank cover over the box 26. One end of the support 40 has the support member 42 bent upwardly, perpendicularly to the plate 40 to provide for support for a cable 28 extending from the box 26. The support member 42 is bent at the bending line defined by the slot 22. The two side sections 41 retain the cable 28 within the prong 49 and limit horizontal movement of the cable 28. Side sections 41 can be bent or twisted together if desired to fully surround cable 28.

Figure 10:
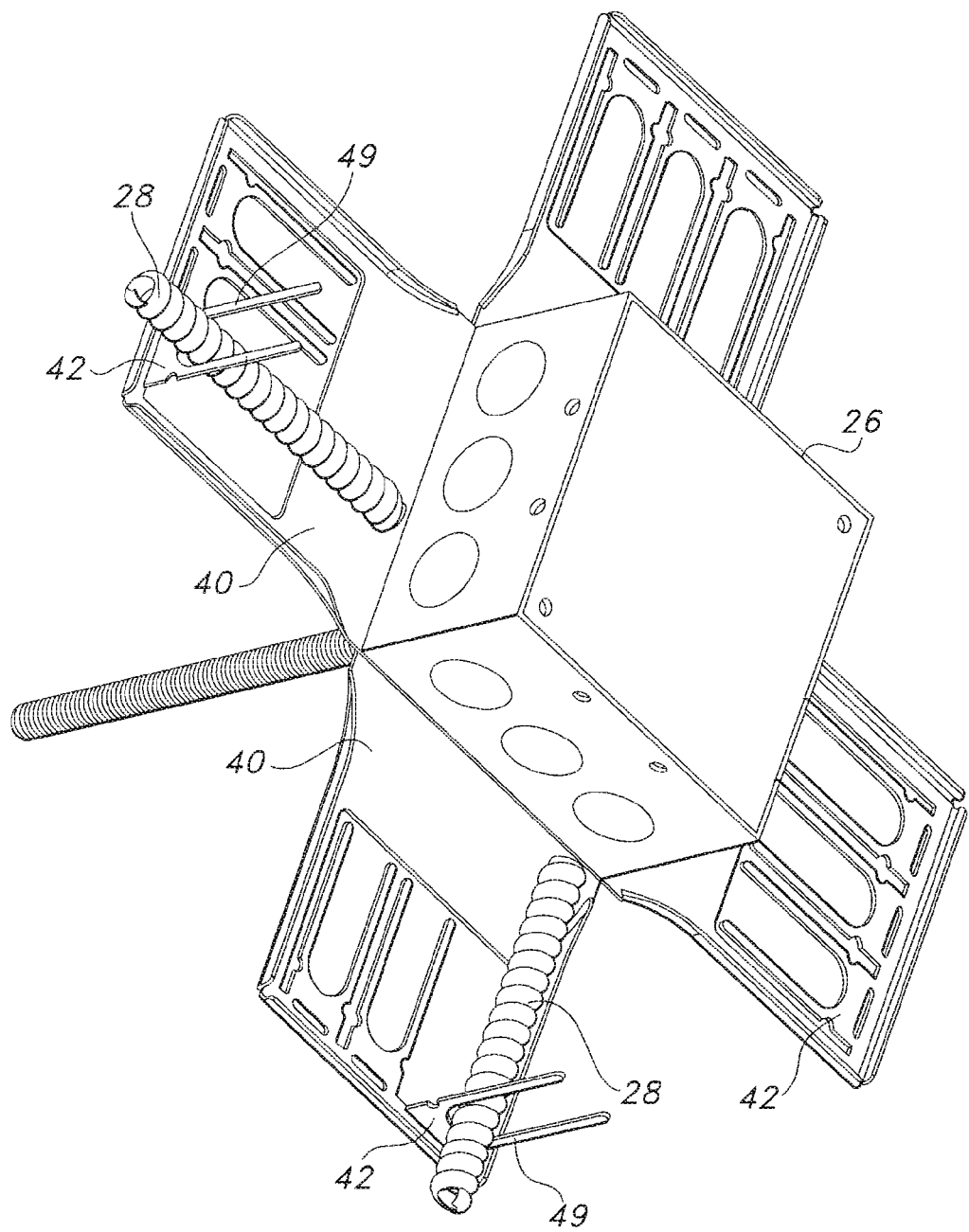
FIG. 10 is a perspective view showing two cable support plates of FIG. 4 attached to a cable box and a cable supported therein.

FIG. 10 shows two support plates 40 attached at the center portion 48 and extending perpendicular to each other. One end of a threaded rod 50 is attached to the support plate 40 and box 26 and the other end of the threaded rod 50 is attached to a support structure or ceiling. The box 26 includes a blank cover. The box 26 may be affixed to the brackets by mounting hardware such as by screws which are screwed through the box 26 and into the holes 45 in the plate 40. The plate 40 provides support of cables 28 running through the box 26 out each of the sides of the box 26. Additionally, the present invention provides for the user to custom design the cable and box support as needed. A variety of prong 49 combinations may be used depending on the cable support required. Each prong 49 can be individually moved vertically in place. For example, one prong 49 may be positioned vertically to accommodate a cable 28 or various combinations of prongs 49 may be positioned to accept a cable 28 as needed to for a specific cable system. Prongs 49 are preferably punched out in plate 40 so that they are in alignment with the knock-outs in box 26.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. The true scope of the invention is set forth in the claims appended hereto.

What is claimed is:

1. A cable and box support plate for supporting cables comprising rectangular, flat planar plate having a pair of elongated side edges and a pair of end edges with at least one integral cable/conduit support member formed therein, said plate including a central portion with holes for attachment to an electrical box and said at least one support member is located on either side of said central portion, said at least one support member includes a U-shaped prong having a thick base closest to the ends of the plate, wherein said U-shaped prong is bendable at said base perpendicularly from said plate, and wherein said each of said pair of end edges further includes a ridge perpendicularly extending from said plate.

2. The cable and box support plate of claim 1, wherein said support plate has a perimeter about said support plate and said at least one support member is positioned internally to said perimeter of said support plate.

3. The cable and box support plate of claim 1, wherein each of said U-shaped prong has a separate thick base which extends between said U-shaped prong and said end edge by material continuity.

4. The cable and box support plate of claim 3, further including a slot between said end edge and said U-shaped prong.

5. The cable and box support plate of claim 4, wherein said plate includes a plurality of support members on either side of said central portion.

6. The cable and box support plate of claim 1, wherein said at least one support member is located between said ridge and said central portion.

7. The cable and box support plate of claim 1, further including a pair of perpendicularly extending edge stiffeners extending from the perimeter of said plate on either side of each said at least one support member.

8. The cable and box support plate of claim 7, wherein said pair of edge stiffener is located adjacent to and perpendicular to said ridge.

9. The cable and box support plate of claim 7, wherein said pair of edge stiffener and said ridge frame said at least one support member about three sides.

10. A cable and box support plate for supporting cables comprising rectangular, flat planar plate with integral cable/conduit support member formed therein, said plate including a central portion with holes for attachment to an electrical box, said support members are located on either side of said central portion, said support member includes a U-shaped prong having a thick base closest to the ends of the plate, wherein said U-shaped prong is bendable at said base perpendicularly from said plate and extends towards said central portion, said support plate further including edge stiffeners about a portion of the perimeter of said plate, said center portion remaining free from edge stiffeners.

11. A cable and box support plate system for supporting cables comprising
two plates with integral cable/conduit support members formed therein, each of said two plates includes a central portion with holes and at least one said support member is located on either side of said central portion, said support members include at least one U-shaped prong having a thick base closest to the ends of the plate, wherein said U-shaped prong is bendable at said base perpendicularly from said plate and said at least one U-shaped prong extending from each of the ends of said plate and extending towards said central portion; and
an electrical box attached to said two plates at the central portion.

12. The cable and box support plate system of claim 11 wherein said two plates are each rectangular in shape and a flat planar member.

13. The cable and box support plate system of claim 11, wherein each of said two plates further includes a ridge perpendicularly extending from said each of said two plates at either end of said each of said two plates by said at least one support member.

14. The cable and box support plate system of claim 13, wherein said each of said two support plates has a perimeter about said each of said two support plates and said at least one support member is positioned internally to said perimeter of said each of said two support plates.

15. The cable and box support plate system of claim 14, wherein each of said at least one U-shaped prong extending from a thick base and said thick base interconnects said U-shaped prong to said each of said two support plates by material continuity.

16. The cable and box support plate system of claim 15, further including a pair of perpendicularly extending edge stiffeners extending from the perimeter of said each of said two plates on either side of each said at least one support member.

17. The cable and box support plate system of claim 16, wherein said each of two support plates are perpendicular to the other and adjoin in the center portion.

* * * * *